United States Patent [19]

Sadle et al.

[11] 4,157,318

[45] Jun. 5, 1979

[54] STARCH CARRIER COMPOSITION FOR ADHESIVE CONTAINING UREA AS A SELATINIZING AGENT

[75] Inventors: Alexander Sadle, Morristown, N.J.; Thomas J. Pratt, Chester, N.Y.

[73] Assignee: International Paper Company, New York, N.Y.

[21] Appl. No.: 821,257

[22] Filed: Aug. 2, 1977

[51] Int. Cl.² ............................................. C08L 3/02
[52] U.S. Cl. ..................... 260/17.2; 106/213; 260/9; 260/17.3; 260/17.4 ST; 428/186; 428/533
[58] Field of Search ......................................... 106/213

[56] References Cited

U.S. PATENT DOCUMENTS

| | | | |
|---|---|---|---|
| 3,284,381 | 11/1966 | Hickey et al. | 260/17.3 |
| 3,728,141 | 4/1973 | Ray-Chaudhuri et al. | 106/213 |
| 3,984,275 | 10/1976 | Hofmann et al. | 428/186 |
| 4,009,311 | 2/1977 | Schoenberg | 428/186 |
| 4,033,914 | 7/1977 | Bovier et al. | 260/17.2 |

OTHER PUBLICATIONS

Chem. Abstracts; vol. 65: 7439e, Low-Cost Starch Adhesives, Talbot.

*Primary Examiner*—Edward M. Woodberry
*Attorney, Agent, or Firm*—David H. Klein; Richard J. Ancel

[57] ABSTRACT

A novel carrier composition for corrugating adhesives contains 1 part amylaceous material, about 3 to 5 parts water, and about 0.5 to 4 parts urea. The carrier is self-gelling at room temperature, and lowers the gel temperature of the adhesive paste to within the optimal range for use in making corrugated paperboard. The carrier is especially well-suited for use in acidic adhesive systems since its effect on the gelatinization temperature of the raw starch component is independent of pH.

19 Claims, 2 Drawing Figures

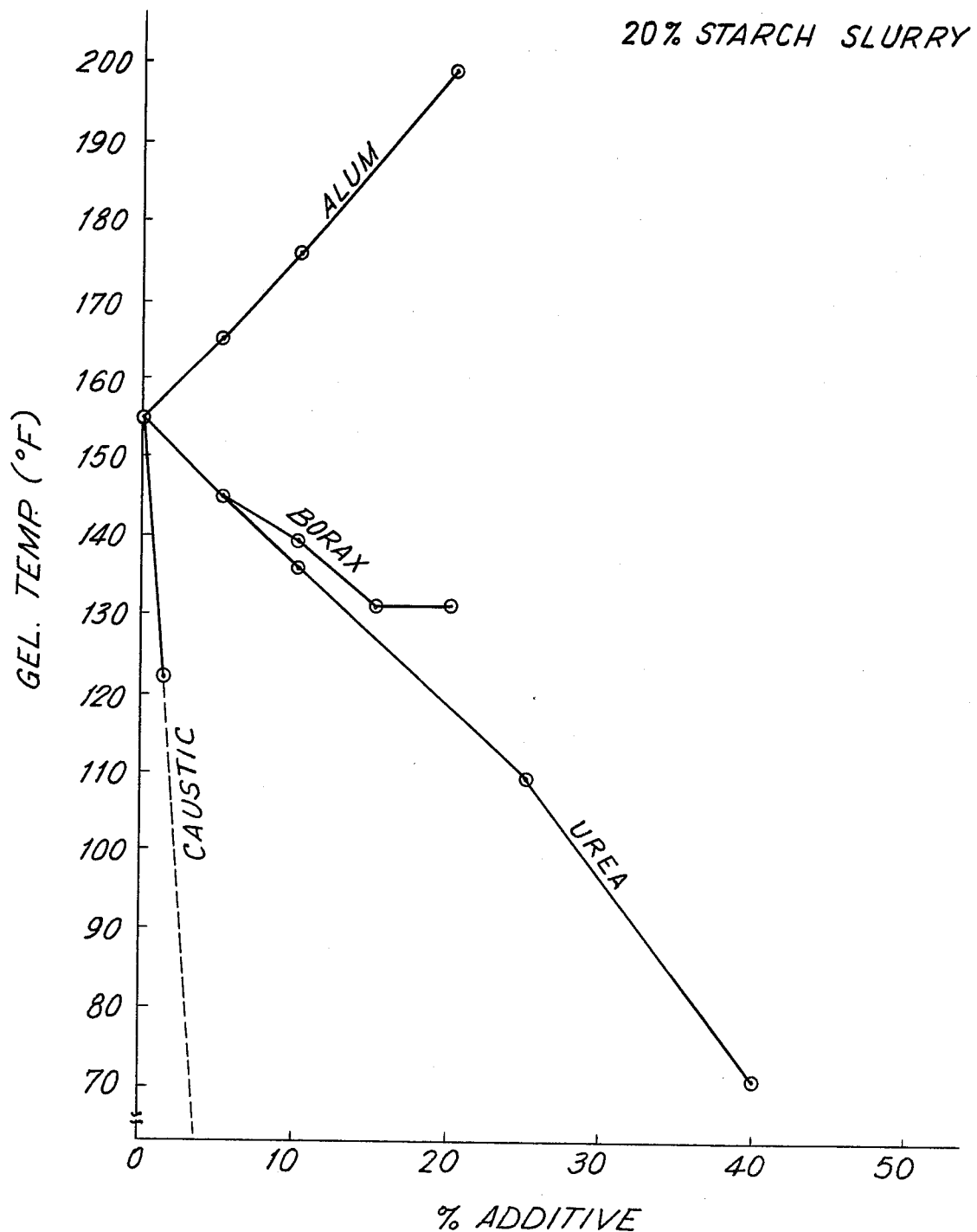

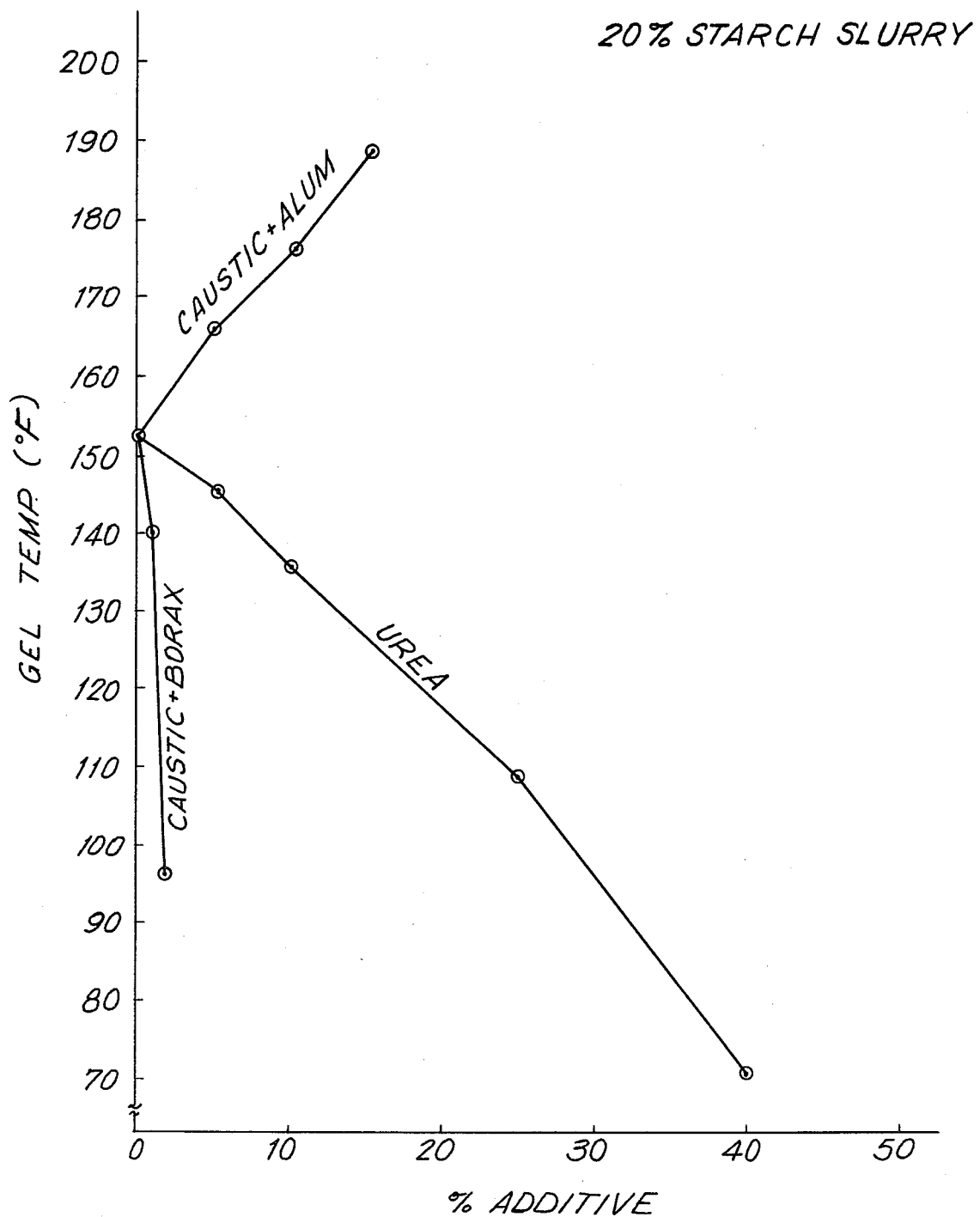

STARCH CARRIER COMPOSITION FOR ADHESIVE CONTAINING UREA AS A SELATINIZING AGENT

BACKGROUND OF THE INVENTION

This invention relates to the method of preparation and composition of an adhesive for bonding cellulose fiber sheets, especially corrugated paperboard, and more specifically to a novel carrier composition for adhesives based on amylaceous materials.

Corrugated paperboard consists of sheets of flat and corrugated paper, bonded together with adhesive. It is commonly made by (1) passing a sheet of paper, which is referred to as the medium, between fluted rolls, usually heated, to form corrugations; (2) applying an adhesive to the tips of the corrugations, known in the art as flutes, on one side of the medium; (3) bringing a flat sheet, which is referred to as the liner, in contact with the adhesive-coated flutes, and (4) bonding the two sheets by the application of heat and pressure. The end product, a single sheet of corrugated medium attached to a single liner, is known as single-face corrugated paperboard. Double-face board may be made by delivering single-face board to a machine known as a double-backer where a second liner may be applied to the exposed flutes of the corrugated single-face in a similar manner.

In the interest of production efficiency, it is desirable to operate the corrugator at the fastest possible rate, usually from about 300 to 700 ft/min depending primarily on board weight. Because the production rate is limited by the speed of formation of the adhesive bond, corrugating adhesives must be capable of rapid increases in viscosity so that the bond may be made quickly. Starch paste is the preferred adhesive in the industry, although adhesives based on other inexpensive materials, such as flour, are also used. Although we will primarily discuss starch pastes, it should be understood that our invention is suitable for use with adhesives based on other amylaceous materials as well.

The adhesive paste is generally formulated in two portions. The primary mix, or carrier, is an extremely viscous solution of gelled (dissolved) starch. The secondary mix contains raw, i.e., ungelled, starch plus additives to expedite the bond formation and to give desired special properties to the paste. When the two portions of the adhesive are combined, the carrier holds the raw starch particles in suspension and imparts sufficient viscosity to the mixture to permit its application by conventional techniques. The adhesive bond is established by heating the paste in situ so that gellation occurs when it is sandwiched between the flute tips and the liner. At the gel temperature, the raw starch component dissolves and absorbs water, causing a rapid increase in the viscosity of the adhesive. Thus, the carrier starch and the raw starch act as co-binding agents in joining the medium to the liner.

Ordinary, or domestic, starch pastes do not produce water-resistant bonds. In order to attain water-resistance, modifiers such as thermosetting resins are added to the finished starch pastes. Although acid cured urea-formaldehyde, melamine-formaldehyde, melamine-urea-formaldehyde resins provide the best water resistance, they are not commonly used because they require higher temperatures to gel. In starch paste technology, sodium hydroxide, or a similar alkaline material is used to reduce the gel temperatures of the pastes to about 140°–155° F. so that they will set rapidly during bond formation. When acidic conditions are employed, the gel temperatures of the pastes are about 155°–165° F. These higher gel temperatures necessitate sharp reductions in the operating speeds of the corrugators, and are therefore not economical. Since the carriers for corrugating adhesives are normally made under alkaline conditions to obtain the desired gel, acidic materials such as alum and ammonium sulfate are added when acid curing resins are to be used in the final adhesive formulations. U.S. Pat. No. 3,984,275, which is herein incorporated by reference, describes such an acid curing resin system in which polyvinyl acetate and a copolymer of vinyl acetate and ethylene are added to improve the wet bond strength of the adhesive.

Whether the adhesive is a domestic paste or one of the water-resistant variety, best results will be achieved if its viscosity, adhesive solids content, and gel temperature are within certain limits which have been well defined by the prior art. Adhesive solids should be high in order to reduce the amount of moisture which is added to the board, since this moisture must be removed during the corrugating process. However, viscosity limitations preclude very high solids since the adhesive must be capable of transfer by the application equipment. In practice, corrugating adhesives usually contain about 15–35% solids. Furthermore, adhesive performance is dependent on high molecular weight in the carrier phase, which also produces high viscosity. The viscosity of the paste before heating should be in the range of 20-80 seconds, as measured by Stein-Hall cup. It is well known that a ratio of carrier starch to raw starch of from about 1 to 3 to about 1 to 8, and a starch to water ratio of from about 1 to 2 to about 1 to 6 are required to meet the viscosity and solids content constraints. The gel temperature should be maintained as low as possible without causing premature galatinization within the adhesive application equipment. The preferred range is 140°–155° F. Adhesives with higher gel points require more heat to gelatinize, which can significantly reduce production rates. For example, the operation of a corrugator producing water-resistant board with an acidic cured urea resin modified starch paste was increased from 200 ft/min to 400 ft/min by converting to a paste incorporating the carrier of this invention. Gel temperature of the resin-modified starch paste was reduced from 162° F. to 144° F. by this modification of the adhesive.

The carrier portion of the typical adhesive is generally prepared by cooking a mixture of starch, water, and sodium hydroxide. Sodium hydroxide, which is known in the art as caustic, reduces the gel temperature of the starch in proportion to the concentration of alkali in the solution. Thus, the caustic which is added to the primary reduces the gel temperature of the carrier starch and also, to a lesser degree, that of the raw starch in the finished paste. However, excessive caustic can degrade the starch and the cellulose in the paperboard, discoloring and weakening the finished product. This degradation may also induce an unstable viscosity in the starch paste. Finally, caustic is difficult to handle safely.

Carriers containing caustic are particularly unsuitable for acid-curing resin systems. Since these pastes develop maximum water-resistance in an acidic environment, the caustic-derived carrier must be neutralized before the resins are added. When the caustic is neutralized, however, its beneficial effect on the gel temperature of the raw starch is lost, and the high gel temperatures of these pastes make reductions in corrugator speeds necessary. Furthermore, if corrugating plants make board with both alkaline and acidic pastes, the entire adhesive-mixing apparatus has to be thoroughly cleaned during changeover to prevent glue bond failure during the transition, and, in some cases, clogging of the glue system. These hindrances to productivity sparked the development of the alkaline water-resistant pastes. The alkaline pastes are not as water-resistant as the acidic pastes, but when the liner boards themselves have only a limited resistance to water, the alkaline adhesives produce adequate bonds. However, these alkaline adhesives are incompatible with the acidic resin systems which are incorporated in ridig-when-wet corrugated boxes and have become a weak link in the box structure.

SUMMARY OF THE INVENTION

It is therefore an object of the present invention to provide a means for reducing the gel temperature of a corrugating adhesive composition independent of its pH.

It is another object to provide a carrier which is compatible with all common corrugating adhesive compositions, including the acidic resin systems.

It is still another object to provide a means for gelling a carrier for corrugating adhesives without cooking.

It is yet another object to provide a carrier without use of caustic.

These and other objects and advantages as described hereinafter are provided by the novel carrier composition of this invention.

The present invention is based on the use of urea as a gelatinizing agent for the carrier starch. In the prior art, urea has been used as a component of the secondary mix to reduce the gel temperature of the raw starch after the carrier has been gelled by conventional means, usually with a combination of heat and caustic. Surprisingly, we have found that the quantity of urea required to gel the carrier at or near room temperature will also reduce the gel temperature of the raw starch in most corrugating adhesives to a value in the optimal temperature range.

BRIEF DESCRIPTION OF THE DRAWINGS

FIG. 1 is a graph showing the effect of urea and several other common additives on the gel temperature of a starch slurry such as would be used to produce the composition of a corrugating paste.

FIG. 2 is a graph showing the effect of urea and several other common combinations of additives on the gel temperature of a starch slurry, as present in the finished paste, i.e., carrier plus secondary mix.

DETAILED DESCRIPTION OF THE INVENTION

In accordance with out invention, the carrier portion of the adhesive is composed of 1 part starch, about 3-5 parts water, and 0.5 to 4, preferably 1 to 3, or most preferably 2 to 2.5 parts urea. First, the starch is mixed with some or all of the water to form a stirrable slurry, about 2 parts water are usually sufficient for this purpose. The urea is then added, along with any remaining water, and the solution stirred to insure uniform distribution of the urea. Gelatinization will take place almost immediately. The gelled carrier is then diluted, if necessary, with enough additional water to make a pourable solution, and added to a secondary mix containing about 3 to 8 and preferably about 4 to 6 parts raw starch as well as enough water to give an overall starch concentration of about 15 to 35 percent by weight.

FIG. 1 shows how the gel temperature of a 20% starch slurry is affected by the addition of two peptizing agents, urea and caustic. Peptizing agents are chemicals which reduce the gel temperatures of starch slurries. Caustic is the only peptizing agent which has been used in the prior art to reduce the gel temperature of the carrier. Thus, the "caustic" curve in FIG. 1 shows the range of gel temperatures achievable in prior art carriers. The "urea" curve shows the range of gel temperatures which may be achieved with the carrier of the subject invention. It will be seen that at a 40% urea concentration, which corresponds to the preferred ratio of 2 parts urea per part of starch in the carrier, the starch will gel at room temperature.

Peptizing agents are not consumed in the reactions which produce lower starch gel temperatures. Thus, when such an agent is employed in the carrier, it affects the gel temperatures of both the carrier and secondary mix starches. The effect of the peptizing agent is a function of its concentration in the starch slurry. The higher the concentration of the agent, the greater will be the reduction in the gel temperature. It will be recalled that the relative proportions of carrier starch, raw starch, and water in the paste are fixed within fairly narrow limits by the viscosity and solids content requirements. Thus, when a quantity of peptizing agent is added to the carrier, dilution by the carrier results in its concentration in the finished paste being reduced to about ¼ to 1/6 of what it is when gelling the carrier. The concentration of peptizing agent in the finished paste should reduce the gel temperature of the raw starch to 140°-155° F. if the adhesive is to be suitable for commercial corrugator operation; ideally, its concentration in the primary mix should place the gel temperature of the carrier starch at or near room temperature. Thus, the energy cost of cooking the carrier may ge avoided. As is shown in FIG. 1, urea has this desirable property.

FIG. 1 also includes the effects of several other common adhesive additives on gelatinization temperature. Borax is used to increase the stringiness and viscosity of the paste. Although it also slightly reduces the gel temperature of the starch, the effect levels off quickly and the presence of borax leads to very high viscosities and unacceptable bonds. Alum may be used in acid-curing resin pastes to reduce the pH of the system. As is shown in FIG. 1, the addition of alum increases the gel temperature of the starch slurry.

FIG. 2 shows how the gel temperature of a 20% starch slurry is affected by several combinations of adhesive additives. The ratios of ingredients are typical of those which occur in finished pastes. The borax/caustic combination is found in prior art domestic pastes, and the caustic/alum combination is found in the acidic water-resistant pastes known in the prior art. Borax is used in prior art domestic pastes to improve the texture (stringiness) of the adhesive and counteract the effects of caustic on its viscosity. A comparison of FIGS. 1 and 2 shows that the caustic/borax combination reduces the gel temperature of the slurry almost as efficiently as caustic alone. However, both borax and caustic are highly alkaline, so this combination cannot be used in acidic water-resistant pastes. Instead, a material, such as alum, is added to neutralize the caustic and provide desired acidity in the paste for optimum rate of cure. As is shown in FIG. 2, the caustic/alum combination actually raises the gel temperature of the starch slurry. Urea, on the other hand, is an effective peptizing agent at any pH. Thus, the "urea" curve in FIG. 2 shows the range of gel temperatures which may be achieved when our invention is incorporated in either an alkaline paste or an acidic paste.

The urea-based carrier of our invention is compatible with all common adhesive additives, including urea-formaldehyde, melamine-formaldehyde, melamine-urea-formaldehyde, resorcinol-formaldehyde, phenol-formaldehyde, and ketone-aldehyde resins, polyvinyl acetate, and copolymers of vinyl acetate and ethylene. It reduces the gel temperature of a paste independent of its pH. Using our novel carrier, water-resistant corrugated board may be produced at about the same rate as domestic corrugated board. In plants which produce both varieties of board, our carrier may be incorporated in both paste formulations, reducing waste and eliminating the time and cost of cleaning the adhesive system during changeover.

As the drawings show, the gel temperature at a given starch level can be decreased by the addition of urea. The drawings show this relationship for a 20% slurry, a starch concentration which may be found in both carriers and finished pastes. The gel temperature of a starch slurry increases as its starch content decreases. However, over the range of starch levels desirable for corrugator operation, the graph of gel temperature versus urea concentration in essentially linear. Thus, the quantity of urea required to gel a carrier at about room temperature will also lower the gel temperature of the finished paste into the optimal range. The quantity required will be about 5-7% by weight on the total mix.

The adhesive produced by our invention has a gel temperature within the range of about 140°–155° F. It has a very short texture, which is advantageous for economical application levels. If a stringier texture is desired, it may be produced in accordance with prior art methods, for example, by briefly cooking the primary mix or by adding borax to the secondary mix. Since urea does not degrade the carrier starch as does caustic, paste made with our novel carrier is more viscous than a caustic paste containing the same amount of starch. Finally, adhesives incorporating our invention are generally less expensive per solid pound than caustic-derived or domestic pastes.

Various modifications and substitutions may be made in our composition without affecting the spirit of our invention. Thus, the temperature of the water used in the carrier may be anywhere in the 70°–100° F. range. The urea may advantageously be added either in solid form or as an aqueous solution. Cereal or root starches such as corn, rice, wheat, tapioca, or potato may be used; corn and wheat flours, which have proteinaceous constituents, have also been used successfully. "Amylaceous" has been used herein to described starches, flours, and other similar materials. A number of these variations are illustrated in the examples given below, but many other will be obvious to those skilled in the art.

EXAMPLE 1

A carrier is made according to the present invention by adding 450 parts of a 50% aqueous urea solution to a slurry containing 225 parts of water and 100 parts of pearl starch. The carrier is heated to 160° F. and agitated for 20 minutes until clear. It is then diluted to a pourable consistency with 500 parts of water.

For comparison, a standard caustic-derived carrier is made by adding 15.2 parts of caustic and 40 parts of water to a slurry containing 395 parts of water and 100 parts of pearl starch. This carrier is also heated to 160° F. and agitated for 20 minutes until clear. It is then diluted to a pourable consistency with 330 parts of water.

15.2 parts of caustic and 40 parts of water are added to the urea-based carrier, and 450 parts of a 50% urea solution is added to the standard carrier. The two solutions now contain identical ingredients in equal quantities, and may be compared for evidence of starch degradation. The standard carrier is pale yellow while the urea-based carrier is colorless, indicating greater degradation in the caustic-derived carrier. The viscosities of the two carriers, in centipoises, are as follows:

| Temp. (° F.) | Viscosity (cps) | |
|---|---|---|
| | Urea | Caustic |
| 140 | 440 | 340 |
| 136 | 460 | 360 |
| 120 | 505 | 376 |
| 78 | 800 | 600 |

EXAMPLE 2

450 lbs. of 50% aqueous urea solution is added to a slurry containing 225 lbs. of water and 100 lbs. of pearl starch. This mixture, the carrier, is agitated until clear, about 15 minutes. The gelled carrier is diluted with 500 lbs. of water and then added to the secondary mix, which was prepared by mixing 1125 lbs. of water, 500 lbs. of pearl starch, and 16 lbs. of borax.

EXAMPLE 3

A standard domestic paste with a caustic-derived carrier is made for comparison with the paste in Example 2. The carrier is made by adding 16 lbs. of caustic dissolved in 42 lbs. of water to a slurry made by mixing 415 lbs. of water with 105 lbs. of pearl starch. The carrier is agitated for about 15 minutes and then diluted with 250 lbs. of water. The diluted carrier is then added to a secondary mix which was prepared by mixing 1500 lbs. of water, 500 lbs. of pearl starch, and 16 lbs. of borax.

Table 1 compares the properties of the urea-based adhesive discussed in Example 2 with those of the caustic-derived adhesive discussed in Example 3. It will be seen that the only significant difference is in the pH of the two adhesives, the urea-based paste being considerably less alkaline.

TABLE 1

| Property | Urea | Caustic |
|---|---|---|
| Starch Solids (%) | 18.1 | 18.7 |
| Viscosity (Stein-Hall sec) | 35. | 40. |
| Gel Temp. (° F.) | 142. | 145. |
| pH | 9.0 | 12.5 |

The two pastes were run on the same corrugator at commercially acceptable speeds using identical board components. Comparative board properties are listed in Table 2.

TABLE 2

| Property | Urea | Caustic |
|---|---|---|
| Short Column Crush (lb/in) | 36.2 | 39 |
| Flat Crush (psi) | 37.2 | 55 |

TABLE 2-continued

| Property | Urea | Caustic |
| --- | --- | --- |
| Pin Adhesion, dry (lb/5 in$^2$) | 67.4 | 68 |

EXAMPLE 4

A carrier mixed as in Example 2, but composed of 375 lbs. of water, 250 lbs. of pearl starch, and 1250 lbs. of a 50% aqueous urea solution, is diluted with 938 lbs. of water and added to a secondary mix containing 1250 lbs. of water, 1250 lbs. of pearl starch, and 185 lbs. of a 50% aqueous alum solution. A mixture of 1375 lbs. of a commercial ethylene-vinyl acetate copolymer (Elvace 1873) and 400 lbs. of a commercial polyvinyl acetate emulsion (National 25-1025 or an equivalent), is then added to the paste. The resulting adhesive may be used with resin-treated components to make rigid-when-wet corrugated board as described in U.S. Pat. No. 3,984,275.

EXAMPLE 5

An acid-curing paste with a caustic-derived carrier is made for comparison with the paste described in Example 4. The carrier is made by adding 9.8 lbs. of caustic dissolved in 50 lbs. of water to a slurry made by mixing 768 lbs. of water with 261 lbs. of pearl starch. The carrier is heated to 160° F. and agitated for about 15 minutes and then diluted with 700 lbs. of water. The diluted carrier is then added to a secondary mix containing 1183 lbs. of water, 1256 lbs. of pearl starch, and 221 lbs. of a 50% aqueous alum solution. A mixture of 1468 lbs. of a commercial ethylene-vinyl acetate copolymer (Elvace 1873), 428 lbs. of a commercial polyvinyl acetate emulsion (National 25-1025 or an equivalent), and 4.5 lbs. of a commercial defoaming agent (Limit 33), is then added to the paste.

Table 3 compares the properties of the adhesive discussed in Examples 4 and 5. The urea-based adhesive of Example 4 has a considerably lower gel temperature.

TABLE 3

| Property | Urea | Caustic |
| --- | --- | --- |
| Starch Solids (%) | 18.15 | 21 |
| Viscosity (Stein-Hall sec) | 42 | 40 |
| Gel Temp. (° F.) | 144 | 162 |
| pH | 3.4 | 3.6 |

The two pastes were run on the same corrugator using identical water-resistant board components. Comparative results are listed in Table 4.

TABLE 4

| Property | Urea | Caustic |
| --- | --- | --- |
| Corrugator Speed (ft/min) | 400+ | 150–200 |
| Flat Crush (psi) | 39 | 39 |
| Dry Pin (lb/5 in$^2$) | 121 | 101 |
| Wet Pin (lb/5 in$^2$) | 34 | 35 |

EXAMPLE 6

A carrier is made by adding 400 lbs. of prilled urea to a slurry containing 1000 lbs. of water and 200 lbs. of pearl starch. The carrier is agitated and heated to 160° F. for 15 minutes by the injection of live steam. After this heating period, water is added to reach a total dilution, water plus condensed steam, of 433 lbs. It is then added to a secondary mix containing 2500 lbs. of water, 1667 lbs. of pearl starch, 22 lbs. of 5 mole borax, and 22 lbs. of ammonium sulfate. The adhesive is diluted with 316 lbs. of water. The resulting domestic paste has the following properties:

| Starch Solids (%) | 25 |
| --- | --- |
| Viscosity (Stein-Hall sec) | 50–60 |
| Gel Tem. (° F.) | 145–150 |
| pH | 8.0–8.5 |

EXAMPLE 7

A carrier composed of 834 lbs. of water, 550 lbs. of a 35% aqueous pearl starch slurry and 875 lbs. of a 50% aqueous urea solution is agitated and heated to 160° F. for 20 minutes by the injection of live steam. After this heating period, water is added to reach a total dilution, water plus condensed steam, of 133 lbs. The diluted carrier is then added to a secondary mix containing 4582 lbs. of a 35% aqueous starch slurry and 33 lbs. of borax. The adhesive is then diluted with 178 lbs. of water. The resulting domestic paste has the following properties:

| Starch Solids (%) | 25 |
| --- | --- |
| Viscosity (Stein-Hall sec) | 50–60 |
| Gel Temp. (° F.) | 145–150 |
| pH | 8.5–9.0 |

EXAMPLE 8

A carrier composed of 116 parts of water, 30 parts of wheat flour, and 30 parts of prilled urea is added to a secondary mix containing 220 parts of water, 120 parts of wheat flour, and 3 parts of borax dissolved in 50 parts of water. The resulting flour paste has the following properties:

| Flour Solids (%) | 24 |
| --- | --- |
| Viscosity (Stein-Hall sec) | 30 |
| Gel Temp. (° F.) | 148 |
| pH | 8.0 |

Generally speaking, the present invention is directed to a novel carrier for corrugating adhesives, an adhesive composition for corrugated paperboard which incoporates this carrier, and a process for preparing corrugating adhesives. The carrier of our invention can reduce the gel temperature of the raw starch in a corrugating adhesive to within the range of about 140°–155° F. independent of the pH of the adhesive. This carrier comprises 1 part amylaceous material, between about 3 and 5 parts water, and between about 0.5 and 4 parts urea. The adhesive composition comprises between about 3 and 8 parts ungelatinized amylaceous material carried in a state of relatively uniform and permanent suspension by the carrier of our invention. The adhesive composition may further comprise polyvinyl acetate and a copolymer of vinyl acetate and ethylene wherein the weight ratio of copolymer to polyvinyl acetate is about 1.5 to 5.7 and the combined amount of copolymer and polyvinyl acetate is about 0.15 to 2 parts per part of starch. The process of preparing this adhesive composition comprises forming a carrier portion by gelatinizing amylaceous material in an aqueous urea solution and mixing this carrier portion with a slurry containing ungelatinized amylaceous material and water. The resulting adhesive composition comprises about one part of gelatinized amylaceous material, between about 3 and 8 parts of ungelatinized amylaceous material, between about 0.5 and 4 parts urea, and between about 15 and 30 parts water. This composition is adapted for use as a bonding agent for corrugated paperboard upon being subjected to heat in situ.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. In an adhesive composition adapted for use as a bonding agent for corrugated paperboard upon being subjected to heat in situ, a carrier comprising 1 part gelatinized amylaceous material, between about 3 and 5 parts water, and between about 0.5 and 4 parts urea, said carrier, in the absence of caustic, being adapted to reduce the temperature at which bonding will take place to within the range of about 140°–155° F.

2. A carrier according to claim 1 wherein said amylaceous material is starch.

3. A carrier according to claim 1, containing between about 1 and 3 parts urea.

4. A carrier according to claim 3, containing between about 2 and 2.5 parts urea.

5. An adhesive composition for corrugated paperboard, comprising between about 3 and 8 parts ungelatinized amylaceous material carried in a state of relatively uniform and permanent suspension by a carrier comprising one part gelatinized amylaceous material, between about 3 and 5 parts water, and between about 0.5 and 4 parts urea, said carrier, in the absence of caustic, being adapted to reduce the gel temperature of said ungelatinized starch independent of the pH of said adhesive composition.

6. An adhesive composition according to claim 5, containing between about 1 and 3 parts urea.

7. An adhesive composition for corrugated paperboard, comprising between about 3 and 8 parts of ungelatinized starch as a co-binding agent carried in a state of relatively uniform and permanent suspension by a carrier comprised of one part gelatinized starch, between about 3 and 5 parts water, and between about 0.5 and 4 parts urea, said carrier, in the absence of caustic, being adapted to act as a co-binding agent while reducing the gel temperature of said ungelatinized starch to within the range of about 140°–155° F.

8. An adhesive composition according to claim 7 further comprising between about 0.01 and 0.2 parts resin solids per part of starch, said resin solids being selected from the group consisting of urea-formaldehyde, melamine-formaldehyde, melamine-urea-formaldehyde, resorcinol-formaldehyde, phenol-formaldehyde, and ketone-aldehyde resins.

9. An adhesive composition according to claim 7 containing between about 1 and 3 parts urea.

10. An adhesive composition according to claim 8 containing between about 1 and 3 parts urea.

11. An adhesive composition for corrugated paperboard having a gel temperature, in the absence of caustic, in the range of about 140°–155° F. and comprising between about 3 and 8 parts starch carried in a state of relatively uniform and permanent suspension by a carrier comprised of one part gelatinized starch, between about 3 and 5 parts water, and between about 0.5 and 4 parts urea, said composition further comprising polyvinyl acetate and a copolymer of vinyl acetate and ethylene wherein the weight ratio of copolymer to polyvinyl acetate is about 1.5 to 5.7 and the combined amount of copolymer and polyvinyl acetate is about 0.15 to 2 parts per part of starch, ungelatinized and gelatinized.

12. A composition according to claim 11 further comprising about 0.01 to 0.2 parts of a thermosetting resin per part of starch.

13. A composition according to claim 12 wherein said thermosetting resin is chosen from the group consisting of urea-formaldehyde, melamine-formaldehyde, melamine-urea-formaldehyde, resorcinol-formaldehyde, phenol-formaldehyde and ketone-aldehyde resins.

14. A process for preparing an adhesive composition for corrugated paperboard having a gel temperature, in the absence of caustic, in the range of about 140°–155° F. which comprises forming a carrier portion by gelatinizing amylaceous material in an aqueous urea solution and mixing said carrier portion with a slurry containing ungelatinized amylaceous material and water, the resulting adhesive composition comprising about one part of gelatinized amylaceous material, between about 3 and 8 parts of ungelatinized amylaceous material, between about 0.5 and 4 parts urea, and between about 15 and 30 parts water.

15. A process according to claim 14 wherein said composition contains between about 1 and 3 parts urea.

16. A process according to claim 15 wherein said amylaceous material is starch.

17. A process according to claim 16 wherein said composition contains between about 2 and 2.5 parts urea.

18. A process according to claim 17 wherein said process further comprises adding polyvinyl acetate and a copolymer of vinyl acetate and ethylene to said adhesive composition, the weight ratio of copolymer to polyvinyl acetate being about 1.5 to 5.7 and the combined amount of copolymer and polyvinyl acetate being about 0.15 to 2 parts per part of starch, ungelatinized and gelatinized 19. A process according to claim 18 wherein said process further comprises adding about 0.01 to 0.2 parts of a thermosetting resin per part of starch, ungelatinized and gelatinized, said thermosetting resin being selected from the group consisting of urea-formaldehye, melamine-formaldehyde, melamine-urea-formaldehyde, resorcinol-formaldehyde, phenol-formaldehyde, and ketone-aldehyde resins.

* * * * *

UNITED STATES PATENT AND TRADEMARK OFFICE
CERTIFICATE OF CORRECTION

PATENT NO. : 4,157,318
DATED : June 5, 1979
INVENTOR(S) : Alexander Sadle et al.

It is certified that error appears in the above-identified patent and that said Letters Patent are hereby corrected as shown below:

Title: "SELATINIZING" should be -- GELATINIZING --.

Col. 3, line 15, delete "ridig" and replace with -- rigid --.

Col. 3, line 56, delete "out" and replace with -- our --.

Signed and Sealed this

Twenty-third Day of October 1979

[SEAL]

Attest:

RUTH C. MASON
Attesting Officer

LUTRELLE F. PARKER
Acting Commissioner of Patents and Trademarks